Aug. 17, 1954   V. G. KLEIN ET AL   2,686,476
INJECTOR
Filed Aug. 4, 1951
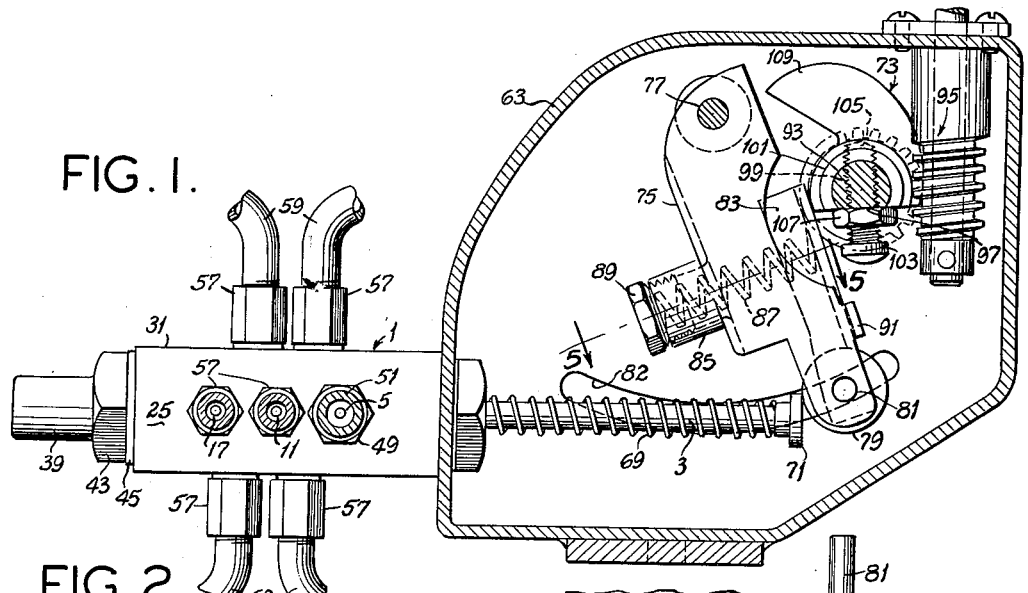
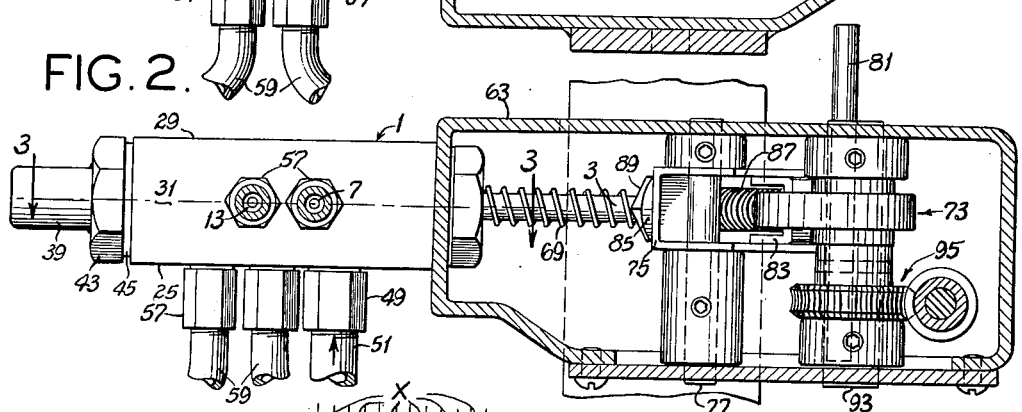
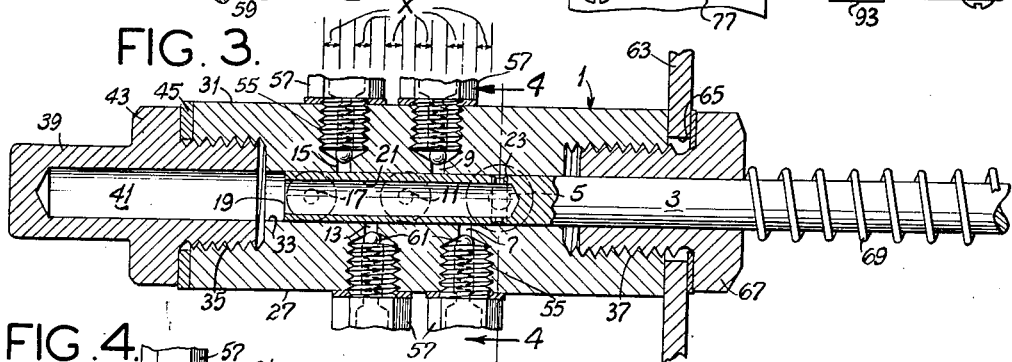
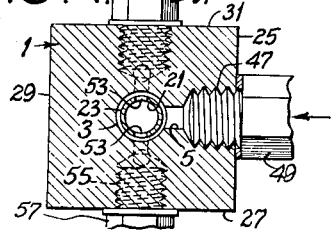
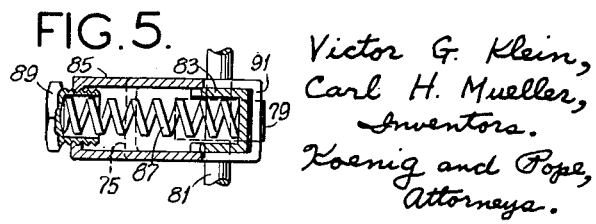
Victor G. Klein,
Carl H. Mueller,
Inventors.
Koenig and Pope,
Attorneys.

Patented Aug. 17, 1954

2,686,476

UNITED STATES PATENT OFFICE 2,686,476

INJECTOR

Victor G. Klein, Defiance, and Carl H. Mueller, St. Louis, Mo., assignors to Lincoln Engineering Company, St. Louis, Mo., a corporation of Missouri Application August 4, 1951, Serial No. 240,382

10 Claims. (Cl. 103—2)

This invention relates to injectors, and more particularly to lubricant injectors.

The invention is concerned primarily with a lubricant injector for use in a lubricating system for forcing lubricant, such as oil, to various points of lubrication. It will be understood, however, that the principles of the invention may be adaptable to an injector for purposes other than lubrication.

Heretofore in the art of lubrication where it has been desired to provide a central system for supplying lubricant to a plurality of points of lubrication, it has been customary to provide a plurality of lubricant injectors, one for each such point, each injector operating upon increase of pressure in a lubricant line supplying the injectors to deliver a measured charge of lubricant. Such multiple-injector systems are shown, for example, in U. S. Patents 2,122,177, 2,141,022, 2,206,335 and 2,283,638. Such systems require the use of as many individual injectors as there are points to be lubricated.

The basic object of this invention is the provision of a single injector which, in a single cycle of operation, is adapted to deliver measured charges of lubricant individually to a plurality of lubrication points, thereby making it possible in many instances to eliminate any necessity for using an individual injector for each such point.

In general, the object of the invention is attained in an injector comprising a cylinder and a plunger movable in the cylinder toward and away from a closed end of the cylinder, the cylinder having an inlet port spaced from its closed end and also having a series of longitudinally spaced outlet ports between the inlet port and its closed end, the plunger having a longitudinal passage establishing communication between its end toward the closed end of the cylinder and a lateral port spaced from the said end of the plunger. The plunger is movable from a charging position, wherein the lateral port in the plunger is in communication with the inlet port of the cylinder, toward the closed end of the cylinder through a pressure stroke successively to force out individual charges through the outlet ports as the lateral port passes the outlet ports. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention are illustrated, Fig. 1 is a view partly in side elevation and partly in vertical section of an injector embodying the invention;

Fig. 2 is a view partly in plan and partly in horizontal section of the injector;

Fig. 3 is an enlarged longitudinal vertical section taken on line 3—3 of Fig. 2;

Fig. 4 is a transverse vertical section taken on line 4—4 of Fig. 3; and,

Fig. 5 is a section taken on line 5—5 of Fig. 1.

Similar reference characters indicate corresponding parts throughout the several views of the drawings.

Referring to the drawing, an injector constructed in accordance with the invention is shown to comprise a cylinder 1 closed at one end, this end being its left end as illustrated. A plunger 3 is movable in the cylinder toward and away from its closed end. The cylinder has an inlet port 5 spaced from its closed end and a series of six longitudinally spaced outlet ports 7, 9, 11, 13, 15 and 17 between the inlet port 5 and its closed end. The plunger is made hollow for some distance from its end 19 toward the closed end of the cylinder to provide a longitudinal passage 21 establishing communication between its end 19 and a lateral port 23 in the plunger spaced from the end 19. The passage 21 is longer than the longitudinal distance from the inlet port 5 to the last outlet port 17 of the series. The plunger is movable from the charging position illustrated in Fig. 3 wherein the lateral port 23 is in communication with the inlet port 5 toward the closed end of the cylinder through a pressure stroke successively to force out individual charges through the outlet ports 7 to 17 as the lateral port 23 passes the outlet ports.

More particularly, the cylinder 1 comprises an elongate cylinder block of generally square cross section, thereby having four flat sides 25, 27, 29 and 31, and having a central longitudinal bore 33 with counterbores 35 and 37 at the left and right ends of the bore 33. The left end of the cylinder is closed by a plug 39 threaded in the left counterbore 35. The plug has a closed-end bore 41 forming a continuation of the bore 33. The plug also has a hexagonal head 43 for application of a wrench. A washer 45, such as a soft metal washer, is compressed between the hexagonal head and the end of a cylinder for sealing purposes.

The inlet port 5 leads laterally into the bore 33 from the side 25 of the cylinder 1. It has a threaded enlargement 47 toward its outer end receiving a fitting 49 for connection of a lubricant supply line 51 for supplying lubricant under pressure to the injector. The line 51, for example, may lead to the injector from an elevated oil reservoir for gravity feed of oil to the injector. The plunger 3 has a close sliding fit in the bore 33. The lateral port 23 in the plunger is formed as an annular peripheral groove with radial openings 53 between the groove and the passage 21. When the plunger is in its Fig. 3 charging position, lubricant may flow from inlet port 5 into the groove 23 and thence through radial openings 53 into the hollow 21 in the plunger.

The inlet port 5 and the successive outlet ports 7 to 17 are successively angularly offset, the outlet ports 11 and 17 leading laterally out of the bore 33 to the side 25 of the cylinder 21, the outlet ports 7 and 13 leading laterally out of the bore to the side 27, and the outlet ports 9 and 15 leading laterally out of the bore to the side 31. The side 29 opposite side 25 is closed. Each outlet port has a threaded enlargement 55 toward its outer end receiving a fitting 57 for connection of a lubricant delivery line 59 leading to the point where it is desired to deliver lubricant. Each fitting 57 contains a spring-biased ball check valve 61.

The longitudinal spacing of the inlet port 5 and the successive outlet ports 7 to 17 is related to the width of the groove 23 so that, as the plunger is moved from its charging position toward the closed end of the cylinder through a pressure stroke, the groove 23 comes into communication with the first outlet port 7 as it passes out of communication with the inlet port 5, and then comes into communication with each successive outlet port as it passes out of communication with the preceding outlet port. This is accomplished by making the interval between the inlet 5 and the first outlet port 7 and the intervals between the successive outlet ports 7 to 17 equal to the width of the groove 23. By "interval" is meant the distance in the longitudinal direction from the leading edge of a port (the edge nearest the closed end of the cylinder) to the trailing edge (the edge farthest from the closed end of the cylinder) of the next successive port. These intervals are indicated at X in Fig. 3, each being equal to the width of the groove 23.

When the plunger is in its Fig. 3 charging position, lubricant will flow into the cylinder and completely fill the passage 21 in the plunger and the space in the cylinder beyond the end 19 of the plunger, including the bore 41 in the plug 39. Then, when the plunger is driven from its charging position toward the closed end of the cylinder, lubricant is displaced from within the cylinder outward through the inlet port 5 until the plunger reaches a position wherein the trailing edge of the groove 23 is cut off from the inlet port and the leading edge of the groove 23 encounters the trailing edge of the first outlet port 7. Then as the groove 23 passes by the outlet port 7, a charge of lubricant is forced out from the cylinder through the radial ports 53, the groove 23, and the outlet port 7 in amount determined by the displacement of the plunger as it moves through the complete distance over which the groove is open to the port. It will be seen that this distance is equivalent to twice the width of the groove 23 plus the width (diameter) of the port 7.

As the plunger continues its pressure stroke, the leading edge of the groove 23 next encounters the trailing edge of the next outlet port 9, as the trailing edge of the groove is cut off from the port 7. Then as the groove 23 passes by the port 9, a charge of lubricant is forced out of the cylinder through the outlet port 9 in amount the same as discharged through the port 7. This action is repeated as the groove 23 passes by the remaining outlet ports 11 to 17. Thus, as the plunger is driven through a pressure stroke from its charging position, equal charges are forced out of the cylinder successively through the outlet ports 7 to 17 one after another. Upon return of the plunger to charging position, the cylinder is recharged.

The plunger 3 may be operated manually, mechanically or electrically, as may be desired. Mechanical operation may include actuation by various mechanical movements or by fluid pressure means. Figs. 1, 2 and 5 illustrate a special cycling mechanism comprehended within the invention adapted during a single cycle of operation to move the plunger through a full pressure stroke and return stroke, and then to move the plunger through a partial pressure stroke and return. By "full pressure stroke" we mean movement of the plunger through such a distance that the groove 23 passes by all six of the outlet ports. By "partial pressure stroke" we mean movement of the plunger through a distance such that groove 23 passes by only a part of the outlet ports 7 to 17, for example only the first two outlet ports 7 and 9. This cycling mechanism is particularly useful in an installation wherein it is desired to deliver more lubricant to some points than to others upon each cycle of operation, noting that the charges delivered through the outlet ports 7 to 17 upon a pressure stroke of the plunger are all equal.

As shown, the special cycling mechanism comprises a housing 63 having an opening 65 (Fig. 3). The cylinder 1 is mounted in position extending from the housing by means of a member 67 threaded into the counterbore 37 at the right end of the cylinder. Plunger 3 extends into the housing 63 through a bore in the member 67. A spring 69 reacts against a head 71 on the outer end of the plunger within the housing to bias the plunger in return direction. The plunger is adapted to be moved through a pressure stroke against the bias of the return spring 69 by means including a cam 73 acting through an overload relief mechanism.

The overload relief mechanism comprises a lever 75 pivoted in the housing for swinging movement in the plane of the plunger on a stud 77. The lever has a roller 79 mounted on a stud 81 at its free end engaging the head 71 at the end of the plunger. The stud 81 extends through an arcuate slot 82 in the side wall of the housing 63, its outer end serving as a handle for manual actuation independently of the cam 73. The stud 81 also serves as a pivot for an arm 83 which extends back toward the stud 77. The lever has a tubular extension 85 opposite the arm 83. A compression spring 87 reacts from a cap 89 threaded in the end of extension 85 against the arm 83 to bias the arm to a limiting position engaging a stop 91 formed as a part of the lever. The spring 87 is strong enough to resist movement of arm 83 relative to lever 75 under normal resistance opposing the swinging of the lever 75, but yields if there is any undue resistance to movement of the plunger 3 through a pressure stroke, as might be encountered, for example, due to blocking of any of the lubricant delivery lines.

The cam 73 is mounted on a camshaft 93 journalled at its ends on the side walls of the housing 63, being positioned to engage the free end of the arm 83. The camshaft is continuously driven by worm gearing indicated at 95 to rotate clockwise as viewed in Fig. 1. The camshaft has a flat at 97 with a tapped hole 99 at right angles to the flat. The cam has a part-cylindric hub 101 fitting on the camshaft, and open at the flat 97. A screw 103 is adjustably threaded into the hole 97 and extends into a hole 105 in the cam. A lock nut 107 on the screw holds it in adjusted position, engaging the flat 97 and the edges of the hub of the cam alongside the flat. The cam has an integral lobe 109 for engagement with the arm 83 developed to swing the arm 83 and lever 75 through such an arc about the axis of the stud 77 as to effect a full pressure stroke of the plunger 3. When the lobe rides off the arm 83, the plunger is returned by the spring 69. Then, as the cam continues to rotate, the head of the screw 103 engages the arm 83 and swings the arm 83 and the lever 75 through such an arc as to effect a partial pressure stroke of the plunger. When the head of the screw rides off the arm 83, the plunger is returned by the spring 69.

The screw 103 may be adjusted by threading it in or out of the tapped hole 99 to vary the extent of the partial pressure stroke. It may be adjusted, for example, so as to provide for a partial pressure stroke of such extent as to force charges of lubricant out through the first two outlet ports 7 and 9, but not through the remaining outlet ports. Under these circumstances, upon a complete revolution of the cam, two charges of lubricant will be forced out of the ports 7 and 9, but only one charge will be forced out of the outlet ports 11 to 17, inclusive. It will be understood that under these circumstances the outlet ports 7 and 9 will be connected by lubricant delivery lines to points of lubrication which need twice as much lubricant as is delivered through the lubricant delivery lines leading from the remaining outlet ports 11 to 17.

From the above, it will be seen that the screw serves as a second lobe on the cam 73 in addition to the lobe 109 adjustable to vary the distance which it moves the plunger, thereby providing for variations in the extent of a partial pressure stroke of the plunger, in case it is desired to provide for injection of double charges of lubricant through different numbers of outlet ports on each cycle of operation.

While the specific embodiment of the invention illustrated herein has six outlet ports, it will be understood that the injector may be constructed with a greater or lesser number of outlet ports.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. An injector comprising a cylinder, a plunger movable in the cylinder toward and away from a constantly closed end of the cylinder, the cylinder having a lateral inlet port spaced from said closed end and a series of longitudinally spaced lateral outlet ports between the inlet port and said closed end, the plunger having a longitudinal passage establishing communication between its end toward the closed end of the cylinder and a lateral port in the plunger spaced from said end of the plunger a distance greater than the longitudinal distance from the inlet port to the last outlet port of the series nearest the closed end of the cylinder, the plunger being movable from a charging position, wherein the lateral port is in communication with the inlet port and wherein the plunger closes all the outlet ports, through a pressure stroke toward the closed end of the cylinder successively to force out individual charges through the outlet ports as the lateral port passes the outlet ports.

2. An injector as set forth in claim 1 wherein the interval between the inlet port and the first outlet port of the series and the intervals between the successive outlet ports are equal to the width of the lateral port in the plunger.

3. An injector as set forth in claim 2 wherein the inlet port and the successive outlet ports are successively angularly offset, and wherein the lateral port in the plunger is formed by an annular peripheral groove in the plunger with at least one radial opening between the groove and the longitudinal passage in the plunger.

4. In combination, an injector comprising a cylinder, a plunger movable in the cylinder toward and away from a constantly closed end of the cylinder, the cylinder having a lateral inlet port spaced from said closed end and a series of longitudinally spaced lateral outlets ports between the inlet port and said closed end, the plunger having a longitudinal passage establishing communication between its end toward the closed end of the cylinder and a lateral port in the plunger spaced from said end of the plunger a distance greater than the longitudinal distance from the inlet port to the last outlet port of the series nearest the closed end of the cylinder, the plunger being movable from a charging position wherein the lateral port is in communication with the inlet port and wherein the plunger closes all the outlet ports, through a pressure stroke toward the closed end of the cylinder successively to force out individual charges through the outlet ports as the lateral port passes the outlet ports, and cycling mechanism acting in a single cycle to effect a full pressure stroke and return of the plunger and a partial pressure stroke and return of the plunger.

5. The combination set forth in claim 4 wherein the cycling mechanism comprises a cam acting on the plunger and having two lobes, one for moving the plunger through a full pressure stroke and the other for moving the plunger through a partial stroke.

6. The combination set forth in claim 5 wherein the said other lobe is adjustable for varying the extent of the partial pressure stroke.

7. The combination set forth in claim 5 wherein the cam acts on the plunger through an overload relief mechanism.

8. An injector comprising a flat-sided cylinder block having a bore constantly closed at one end, a plunger movable in the bore toward and away from the closed end, the block having a lateral inlet port leading into the bore from one flat side and spaced from the closed end, and a series of longitudinally spaced lateral outlet ports between the inlet port and the closed end leading out of the bore through various flat sides of the block, the plunger having a longitudinal passage establishing communication between its end toward the closed end of the bore and a lateral port in the plunger spaced from said end of the plunger a distance greater than the longitudinal distance from the inlet port to the last outlet port of the series nearest the closed end of the bore, the plunger being movable from a charging position wherein the lateral port is in communication with the inlet port and wherein the plunger closes all the outlet ports through a pressure stroke toward the closed end of the bore successively to force out individual charges through the outlet ports as the lateral port passes the outlet ports.

9. An injector as set forth in claim 8 wherein the interval between the inlet port and the first outlet port of the series and the intervals between the succcessive outlet ports are equal to the width of the lateral port in the plunger.

10. An injector as set forth in claim 9 wherein the lateral port in the plunger is formed by an annular groove in the plunger with at least one radial opening between the groove and the longitudinal passage in the plunger.

References Cited in the file of this patent

UNITED STATES PATENTS

| Number | Name | Date |
|---|---|---|
| 1,623,240 | Goodrich | Apr. 5, 1927 |
| 1,893,217 | Babitch | Jan. 3, 1933 |
| 1,952,746 | De Long | Mar. 27, 1934 |
| 2,139,155 | Gernandt | Dec. 6, 1938 |
| 2,360,093 | Ainslie et al. | Oct. 10, 1944 |

FOREIGN PATENTS

| Number | Country | Date |
|---|---|---|
| 259,660 | Italy | July 21, 1928 |
| 450,025 | Great Britain | July 9, 1936 |